United States Patent
Yasuda

(10) Patent No.: US 12,477,194 B2
(45) Date of Patent: Nov. 18, 2025

(54) SYSTEMS AND METHODS FOR ADJUSTING PRESENTATION OF MEDIA CONTENT IN A VEHICULAR ENVIRONMENT

(71) Applicant: Toyota Research Institute, Inc., Los Altos, CA (US)

(72) Inventor: Hiroshi Yasuda, San Francisco, CA (US)

(73) Assignees: Toyota Research Institute, Inc., Los Altos, CA (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 216 days.

(21) Appl. No.: 18/456,134

(22) Filed: Aug. 25, 2023

(65) Prior Publication Data

US 2025/0071393 A1  Feb. 27, 2025

(51) Int. Cl.
*H04N 21/845* (2011.01)
*G01C 21/34* (2006.01)

(52) U.S. Cl.
CPC ......... *H04N 21/8456* (2013.01); *G01C 21/34* (2013.01)

(58) Field of Classification Search
CPC ......... H04N 21/8456; H04N 21/47205; G01C 21/34; G11B 27/00; G11B 27/02; G11B 27/022
USPC ...................................................... 386/278
See application file for complete search history.

(56) References Cited

U.S. PATENT DOCUMENTS

| 2013/0318071 A1* | 11/2013 | Cho | G06F 16/60 |
| | | | 707/722 |
| 2018/0190001 A1* | 7/2018 | Napier | G06T 11/60 |
| 2020/0378778 A1* | 12/2020 | Glazberg | G05D 1/0088 |
| 2023/0063930 A1* | 3/2023 | Ichida | B60W 60/0053 |

OTHER PUBLICATIONS

Alt, et al. "Enabling Micro-Entertainment in Vehicles Based on Context Information", Proceedings of the 2nd international conference on automotive user interfaces and interactive vehicular applications. 2010. Available at http://sahami.org/resource/pdf/alt2010enabling.pdf.

(Continued)

*Primary Examiner* — Thai Q Tran
*Assistant Examiner* — Nienru Yang
(74) *Attorney, Agent, or Firm* — Christopher G. Darrow; Darrow Mustafa PC

(57) ABSTRACT

Systems and methods described herein relate to adjusting presentation of media content in a vehicular environment. In one embodiment, a system for adjusting presentation of media content in a vehicular environment estimates a time at which an operational design domain (ODD) boundary will occur for a vehicle that is operating in an at least semi-autonomous driving mode. The system also processes automatically a media-content item presented to an occupant of the vehicle to generate a modified media-content item, the modified media-content item having a duration that results in presentation of the modified media-content item concluding at a predetermined time not later than the estimated time.

20 Claims, 5 Drawing Sheets

(56) References Cited

OTHER PUBLICATIONS

He, et al. "Auto-Summarization of Audio-Video Presentations", Proceedings of the seventh ACM international conference on Multimedia (Part 1). 1999. Available at https://www.microsoft.com/en-us/research/wp-content/uploads/2016/02/paper-99.pdf.

Brendan Wells, "Using Classification for Analysis of Multi-Modal Video Summarization", Rochester Institute of Technology, 2020. Available at https://scholarworks.rit.edu/cgi/viewcontent.cgi?article=11663&context=theses.

* cited by examiner

SYSTEMS AND METHODS FOR ADJUSTING PRESENTATION OF MEDIA CONTENT IN A VEHICULAR ENVIRONMENT

TECHNICAL FIELD

The subject matter described herein generally relates to semi-autonomous and autonomous vehicles and, more particularly, to systems and methods for adjusting presentation of media content in a vehicular environment.

BACKGROUND

One of the benefits of autonomous and semi-autonomous vehicles is that vehicle occupants, including an occupant prepared to assume the role of driver, when necessary, can engage in non-driving-related activities such as consuming media content (e.g., watching movies or television shows, listening to audiobooks, reading text, or playing video games). However, in some situations, a media-content item's duration exceeds the available time before the trip ends. Solutions currently exist to extend automatically the duration of a trip so a vehicle occupant can finish consuming a media-content item before the vehicle arrives at its planned destination. For example, the vehicle might automatically select a longer route and/or drive at a slower speed to lengthen the trip's duration.

SUMMARY

An example of a system for adjusting presentation of media content in a vehicular environment is presented herein. The system comprises a processor and a memory storing machine-readable instructions that, when executed by the processor, cause the processor to estimate a time at which an operational design domain (ODD) boundary will occur for a vehicle that is operating in an at least semi-autonomous driving mode. The memory also stores machine-readable instructions that, when executed by the processor, cause the processor to process automatically a media-content item presented to an occupant of the vehicle to generate a modified media-content item, the modified media-content item having a duration that results in presentation of the modified media-content item concluding at a predetermined time not later than the estimated time.

Another embodiment is a non-transitory computer-readable medium for adjusting presentation of media content in a vehicular environment and storing instructions that, when executed by a processor, cause the processor to estimate a time at which an operational design domain (ODD) boundary will occur for a vehicle that is operating in an at least semi-autonomous driving mode. The instructions also cause the processor to process automatically a media-content item presented to an occupant of the vehicle to generate a modified media-content item, the modified media-content item having a duration that results in presentation of the modified media-content item concluding at a predetermined time not later than the estimated time.

In another embodiment, a method of adjusting presentation of media content in a vehicular environment is disclosed. The method comprises estimating, using a processor, a time at which an operational design domain (ODD) boundary will occur for a vehicle that is operating in an at least semi-autonomous driving mode. The method also includes processing automatically a media-content item presented to an occupant of the vehicle to generate a modified media-content item, the modified media-content item having a duration that results in presentation of the modified media-content item concluding at a predetermined time not later than the estimated time.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
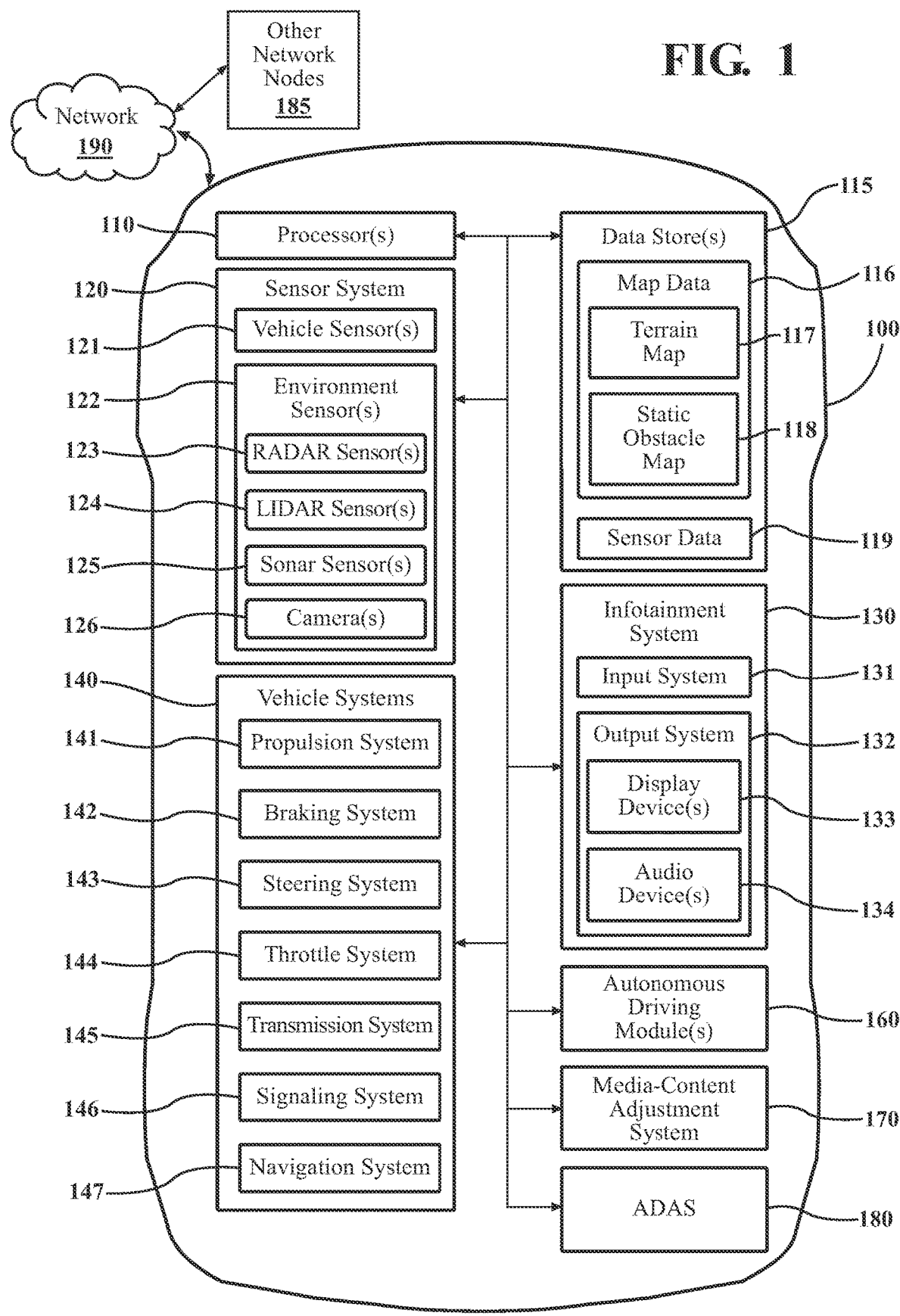
FIG. 1 illustrates one embodiment of a vehicle within which systems and methods disclosed herein may be implemented.

Various embodiments of systems and methods for adjusting presentation of media content in a vehicular environment disclosed herein improve upon current solutions by eliminating the need to extend the duration of a trip to permit a vehicle occupant to finish consuming a media-content item before the vehicle reaches its planned destination. Instead, the various embodiments disclosed herein process a media-content item to generate a modified media-content item having a shorter or longer duration than the original media-content item, permitting the modified media-content item to be consumed in its entirety within a timeframe that is convenient for the vehicle occupant without extending the duration of the trip.

More specifically, the various embodiments estimate the time at which an operational design domain (ODD) boundary will occur for a vehicle that is operating in a semi-autonomous or autonomous driving mode. Herein, an "ODD boundary" generally refers to an event that falls into one of two categories: (1) the end of the current trip (reaching a final planned destination) or an intermediate stop that is or becomes part of the current trip (e.g., a refueling or recharging stop) or (2) a planned (expected) handover of control of the vehicle to a human driver. Examples of ODD boundaries in the second category include, without limitation, entering a road-construction zone in which the vehicle needs to be driven manually or the crossing of a predetermined geofence boundary beyond which the vehicle needs to be driven manually. In some embodiments, an ODD boundary can also be defined based on one or more operational parameters of the vehicle satisfying one or more predetermined criteria. Such ODD boundaries can implicate either of the two categories mentioned above. For example, a prediction that an electric-vehicle (EV) battery charge level will fall below a predetermined threshold or a prediction that a low-fuel condition will occur in an internal-combustion-engine (ICE) vehicle could result in the vehicle making an additional planned stop at a recharging or refueling station, implicating the first category of ODD boundaries above. An example of an operational parameter of the vehicle implicating the second category is the vehicle entering a section of highway or an urban environment where the current user-selected level of autonomy (e.g., Society of Automotive Engineers (SAE) Level 2) is inadequate for the vehicle to navigate safely, necessitating a handover of control to a human driver.

The various embodiments also process automatically a media-content item presented to an occupant of the vehicle to generate a modified media-content item. The modified media-content item has a duration that results in presentation of the modified media-content item concluding at a predetermined time not later than the estimated time of the ODD boundary. The media-content item can be, for example, a video (with or without accompanying audio), an audio recording such as a podcast or an audiobook, an item of text (e.g., an electronic book (ebook), a news article, etc.), or a video game. That is, a given media-content item can be interactive (e.g., a video game) or non-interactive (e.g., a movie or audiobook). The various embodiments can automatically shorten the duration of a media-content item that is too long for the vehicle occupant to finish before the estimated time of the ODD boundary. Likewise, the various embodiments can automatically expand (lengthen) the duration of a media-content item that does not adequately fill the available time before the estimated time of the ODD boundary. In some embodiments, artificial-intelligence (AI) techniques such as machine-learning (ML) models are used to summarize (shorten) or expand/lengthen a media-content item. Such ML models can include, without limitation, generative-AI models, large language models (LLMs), and other types of models. As those skilled in the art are aware, ML models can include one or more neural networks.

If the estimated time of occurrence of the ODD boundary later changes due to a change in the ODD boundary (e.g., a vehicle occupant changes the final destination of the trip while enroute), the various embodiments can also automatically process the previously modified media-content item or the original media-content item to generate an adjusted media-content item having an updated duration (longer or shorter than the modified media-content item, depending on the situation) that results in presentation of the adjusted media-content item concluding at an updated predetermined time that occurs not later than the updated estimated time of occurrence of the ODD boundary.

Referring to FIG. 1, an example of a vehicle 100, in which systems and methods disclosed herein can be implemented, is illustrated. As used herein, a "vehicle" is any form of motorized transport. One example of a "vehicle," without limitation, is an automobile. In some embodiments, vehicle 100 can operate, at least some of the time, in an autonomous driving mode (e.g., SAE Levels 3-5, Level 5 corresponding to full autonomy). In other embodiments, vehicle 100 can operate, at least some of the time, in a semi-autonomous driving mode (e.g., via an adaptive cruise-control system, an automatic lane-change assistance system, an automatic parking system, and/or an Advanced Driver-Assistance System (ADAS) 180). In some embodiments, vehicle 100 may, at times, be driven manually by a human driver. The vehicle 100 can include a media-content adjustment system 170 or capabilities to support or interact with the media-content adjustment system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including media-content adjustment system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 can communicate with other network nodes 185 (e.g., other connected vehicles, cloud servers, edge servers, roadside units, infrastructure devices and equipment, etc.) via a network 190. In some embodiments, network 190 includes the Internet.

Some of the other possible elements of vehicle 100 are shown in FIG. 1 and will be described in connection with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Depending on the particular embodiment, vehicle 100 includes various elements that support semi-autonomous and/or fully autonomous driving. For example, sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122 Environment sensors 122 generally include, without limitation, radar sensor(s) 123, Light Detection and Ranging (LIDAR) sensor(s) 124, sonar sensor (s) 125, and camera(s) 126. One or more of these various types of environment sensors 122 can be used to ascertain the state of vehicle 100 (its speed, acceleration, observed trajectory data, etc.) and to detect moving objects such as external road agents or other objects in the environment of vehicle 100, whether the road agents or objects are on or off of the roadway. Thus, sensor system 120 contributes to vehicle 100 "understanding" and responding to the environment surrounding vehicle 100. As mentioned above, depending on the embodiment, vehicle 100 includes autonomous driving module(s) 160 and/or ADAS 180 to control fully autonomous or semi-autonomous driving modes of vehicle 100. The autonomous driving module(s) 160 and/or ADAS 180 can do so by controlling various vehicle systems 140 of vehicle 100.

As shown in FIG. 1, vehicle 100 includes an infotainment system 130 equipped with an input system 131 and an output system 132 that includes display device(s) 133 and audio device(s) 134. Input system 131 provides Human-Machine-Interface (HMI) activation elements by which vehicle occupants can control the operation of infotainment system 130. For example, in some embodiments, input system 131 includes a touchscreen display that presents various options and virtual controls for selecting and playing or otherwise presenting, to one or more vehicle occupants, media-content items. In other embodiments, input system 131 includes various physical controls (knobs, buttons, dials, etc.) to enable a vehicle occupant to control selection and presentation/playback of media-content items. In still other embodiments, infotainment system 130 interfaces with a vehicle occupant's portable device such as a smartphone or tablet computer to select and present, via infotainment system 130, media-content items to a vehicle occupant. In some embodiments, infotainment system 130 receives (downloads) media-content items from one or more of the other network nodes 185 via network 190 and stores the media-content items. In some embodiments, infotainment system 130 streams media-content items from one or more of the other network nodes 185.

Figure 2:
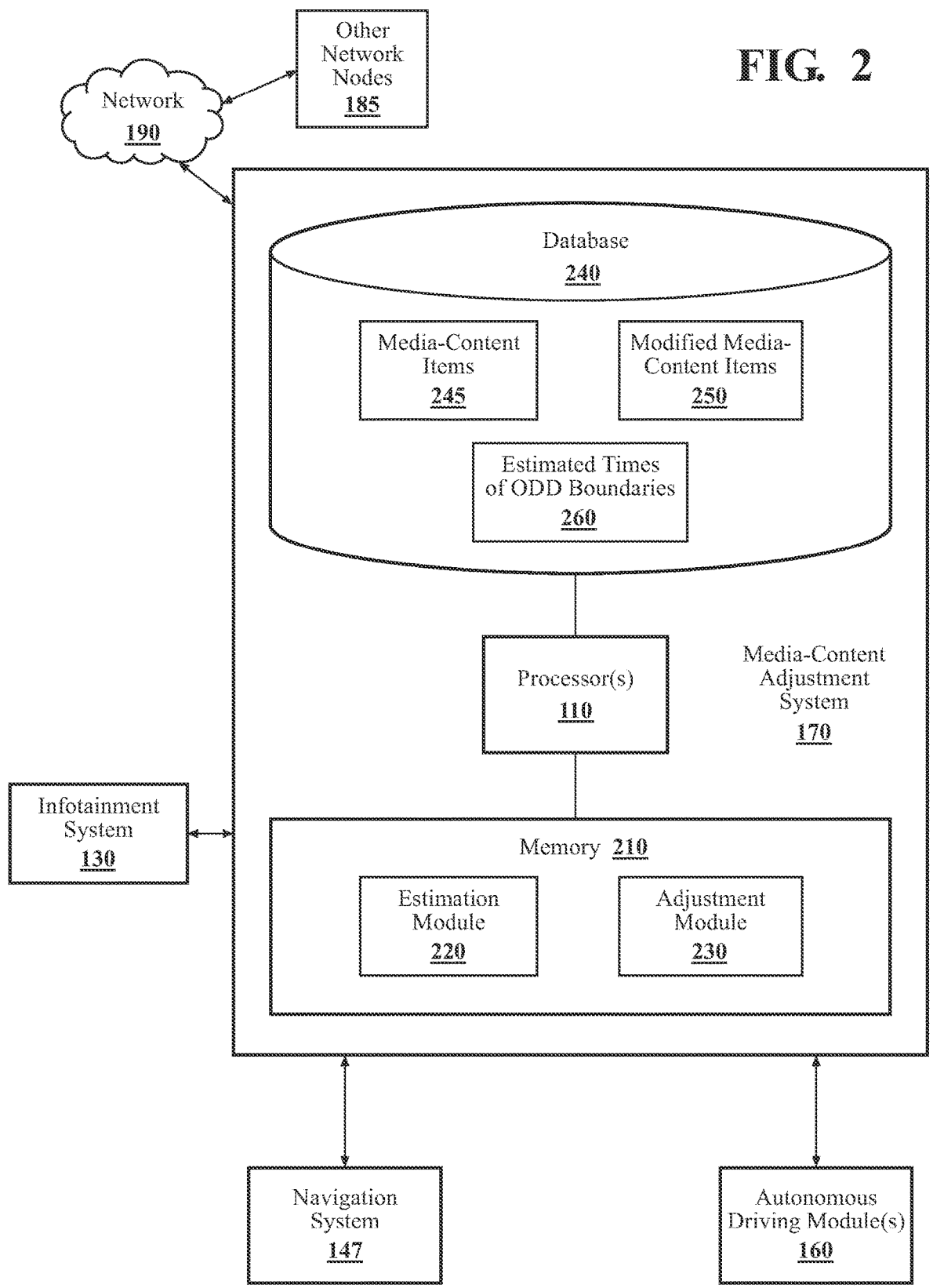
FIG. 2 is a block diagram of a media-content adjustment system, in accordance with an illustrative embodiment of the invention.

FIG. 2 is a block diagram of a media-content adjustment system 170, in accordance with an illustrative embodiment of the invention. In the embodiment of FIG. 2, media-content adjustment system 170 is shown as including one or more processors 110 from the vehicle 100 of FIG. 1. In general, the one or more processors 110 may be a part of media-content adjustment system 170, media-content adjustment system 170 may include one or more separate processors from the one or more processors 110 of the vehicle 100, or media-content adjustment system 170 may access the one or more processors 110 through a data bus or another communication path, depending on the embodiment.

In this embodiment, memory 210 stores an estimation module 220 and an adjustment module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that, when executed by the one or more processors 110, cause the one or more processors 110 to perform the various functions disclosed herein.

Media-content adjustment system 170 can store various kinds of data in a database 240. Examples include media-content items 245, modified media-content items 250, and estimated times of occurrence of ODD boundaries (hereinafter, simply "estimated times 260"). An estimated time 260 is the estimated time at which an ODD boundary pertaining to vehicle 100 will occur. As discussed above, the media-content items 245 can include, without limitation, videos (with or without accompanying audio), audio recordings such as podcasts or audiobooks, items of text (e.g., electronic books (ebooks), news articles, etc.), or video games. How modified media-content items 250 are generated is discussed in greater detail below in connection with adjustment module 230 and FIGS. 3A-6C.

As shown in FIG. 2 and as discussed above, media-content adjustment system 170 can communicate with one or more other network nodes 185 (e.g., other connected vehicles, cloud servers, edge servers, roadside units, infrastructure, etc.) via network 190. Media-content adjustment system 170 can receive information regarding upcoming ODD boundaries from, for example, traffic information servers, weather information servers, navigation system 147, autonomous driving module(s) 160, map data 116, and other vehicle components and systems (e.g., an electrical charging system or fuel system) to calculate corresponding estimated times 260. In communicating with servers such as traffic information and weather servers, vehicle 100 can employ technologies such as cellular data (e.g., LTE, 5G, 6G). As also shown in FIG. 2, media-content adjustment system 170 interfaces and communicates with infotainment system 130, navigation system 147, and autonomous driving module(s) 160.

Estimation module 220 generally includes instructions that when executed by the one or more processors 110 cause the one or more processors 110 to estimate a time 260 at which an ODD boundary will occur for a vehicle 100 that is operating in an at least semi-autonomous driving mode. As discussed above, an ODD boundary is an event that falls into one of two categories: (1) the end of the current trip (reaching a final planned destination) or an intermediate stop that is or becomes part of the current trip (e.g., a refueling or recharging stop) or (2) a planned handover of control of the vehicle 100 to a human driver at a future time. ODD boundaries in the first category generally involve situations in which vehicle occupants are likely to exit vehicle 100, at least temporarily. Examples of ODD boundaries in the second category include, without limitation, entering a road-construction zone in which the vehicle 100 needs to be driven manually or the crossing of a predetermined geofence boundary (e.g., at a highway off-ramp) beyond which the vehicle 100 needs to be driven manually.

As also discussed above, in some embodiments, an ODD boundary can be defined based on one or more operational parameters of the vehicle 100 satisfying one or more predetermined criteria. Such ODD boundaries can implicate either of the two categories just mentioned. For example, a prediction that an EV battery charge level (an operational parameter) will fall below a predetermined threshold or a prediction that a low-fuel condition (an operational parameter) will occur in an ICE vehicle could result in the vehicle 100 making an intermediate planned stop at a recharging or refueling station, implicating the first category. The vehicle 100 entering a section of highway or an urban environment where the current user-selected level of autonomy (e.g., SAE Level 2) is inadequate for the vehicle 100 to navigate safely, necessitating a handover of control to a human driver, implicates the second category.

As mentioned above, estimation module 220 can receive information concerning upcoming ODD boundaries from a variety of information sources, including, without limitation, traffic information servers, weather information servers, navigation system 147, autonomous driving module(s) 160, map data 116, and other vehicle components and systems (e.g., an electrical charging system or fuel system). For example estimation module 220 might receive a notification from a traffic information server that there is a construction zone 45 miles ahead on the currently traveled roadway. From map data 116 or another information source, estimation module 220 might also determine that semi-autonomous or autonomous driving in the upcoming construction zone is not feasible, necessitating a handover. Based on that information and the vehicle's measured speed from a vehicle sensor 121, estimation module 220 can estimate the time 260 at which the vehicle 100 will enter the construction zone, by which time the handover will occur. An additional example is estimation module 220 calculating an estimated time 260 at which the current trip will end based on information (route, expected travel time, etc.) from navigation system 147 and vehicle sensors 121. Yet another example is estimation module 220 determining that vehicle 100 will require recharging or refueling approximately 110 miles ahead along the planned route and calculating an estimated time 260 at which vehicle 100 will arrive at a selected recharging or refueling station.

Adjustment module 230 generally includes instructions that when executed by the one or more processors 110 cause the one or more processors 110 to process automatically a media-content item 245 presented to an occupant of the vehicle 100 to generate a modified media-content item 250, the modified media-content item 250 having a duration that results in presentation of the modified media-content item 250 concluding at a predetermined time not later than the estimated time 260. It should be understood that, in this context, presentation of the modified media-content item 250 concludes at the predetermined time because all the data constituting the modified media-content item 250 (e.g., the entirety of a modified movie, the entirety of a modified audiobook, etc.) has been presented to the vehicle occupant (i.e., the vehicle occupant has finished consuming the modified media-content item 250). This means that if the duration of the original media-content item 245 is longer than the available time (the time between when presentation of the media-content item 245 would begin and the predetermined time), adjustment module 230 generates a modified media-content item 250 having a shorter duration that fits within the available time. Similarly, if the duration of the original media-content item 245 is shorter than the available time, adjustment module 230 generates a modified media-content item 250 having a longer duration that better fills the available time. Adjustment module 230 can shorten or lengthen the duration of a media-content item 245 through various automatic data summarization or extension technologies to be described in greater detail below.

It should also be understood that, herein, "modifying" a media-content item 245 does not mean simply automatically stopping or pausing presentation of an unfinished media-content item 245 at the predetermined time, if its duration exceeds the available time. Likewise, herein, "modifying" a media-content item 245 does not mean simply automatically pausing and resuming presentation of the media-content item 245 one or more times to pad the duration of its presentation to fill the available time. Instead, adjustment module 230 actually alters the data constituting the media-content item 245 to shorten or lengthen its duration when it is presented to the vehicle occupant as modified media-content item 250.

The predetermined time mentioned above can vary, depending on the embodiment and the circumstances surrounding a particular ODD boundary. In some embodiments, the predetermined time coincides with (is the same as) the estimated time 260. In other embodiments, adjustment module 230 can select the predetermined time to be somewhat earlier (e.g., from a few seconds to a few minutes) than the estimated time 260. In situations in which the ODD boundary involves a planned handover, it is advantageous to select a predetermined time that gives a human driver of vehicle 100 adequate time to prepare to take over control of vehicle 100 (e.g., 1 to 3 minutes, in some embodiments).

In some embodiments, adjustment module 230 notifies a vehicle occupant consuming a media-content item 245 that the media-content item 245 has been modified to fit the available time. In some of those embodiments, adjustment module 230 asks the vehicle occupant to confirm modification (shortening or lengthening) of the media-content item. If a situation arises in which the available time is much shorter than the nominal duration of a media-content item 245, adjustment module 230 can optionally offer to substitute one or more different media-content items 245 that will fit within the available time.

In summary, adjustment module 230 either shortens the duration of the media-content item 245 to enable the vehicle occupant to finish the modified media-content item 250 before the ODD boundary occurs or lengthens the duration of the media-content item 245 such that the modified media-content item 250 fills a predetermined amount of available time (i.e., the time from the start time 320 until the predetermined time 330) before the ODD boundary occurs.

Several non-limiting examples of adjustment module 230 processing a media-content item 245 to generate a modified media-content item 250 having a shorter or longer duration than that of the original media-content item 245 are discussed below in connection with FIGS. 3A-6C.

Figure 3A:
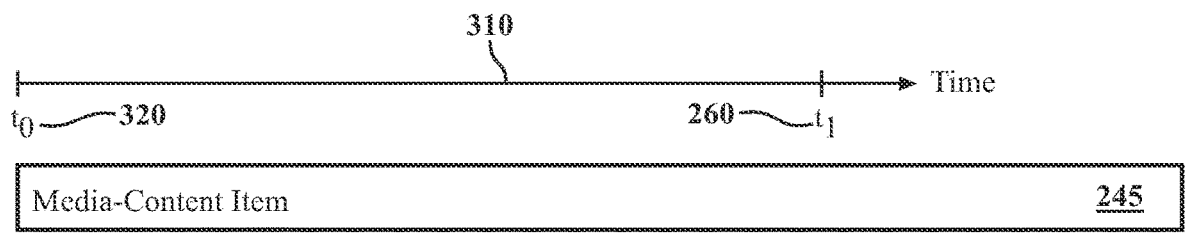
FIGS. 3A and 3B illustrate an example of a media-content item that is processed to shorten its duration, in accordance with an illustrative embodiment of the invention.
Figure 3B:
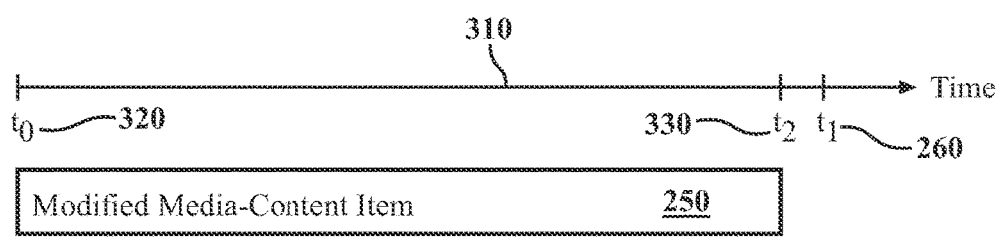

FIG. 3A illustrates a media-content item 245 whose duration is longer than the available time, where the available time is the difference between the estimated time 260 ($t_1$) and the presentation start time 320 ($t_0$). In FIGS. 3A-6C, the times in question are indicated on a timeline (time axis) 310. As discussed above, in a situation such as that shown in FIG. 3A, adjustment module 230 automatically processes the media-content item 245 to generate a modified media-content item 250 having a shorter duration that fits within the available time. This is illustrated in FIG. 3B. Note that, in FIG. 3B, the predetermined time 330 ($t_2$) discussed above (the time at which presentation of the complete modified media-content item 250 concludes) is arbitrarily depicted, for the sake of clarity, as being somewhat earlier in time than the estimated time 260. This is simply illustrative, however. As explained above, in some embodiments the predetermined time 330 coincides with the estimated time 260. In other embodiments, the predetermined time 330 precedes the estimated time 260 by a relatively brief interval (e.g., from a few seconds to a few minutes).

Figure 4A:
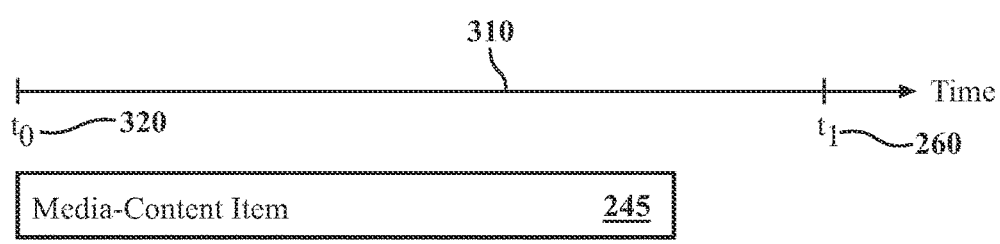
FIGS. 4A and 4B illustrate an example of a media-content item that is processed to lengthen its duration, in accordance with an illustrative embodiment of the invention.
Figure 4B:
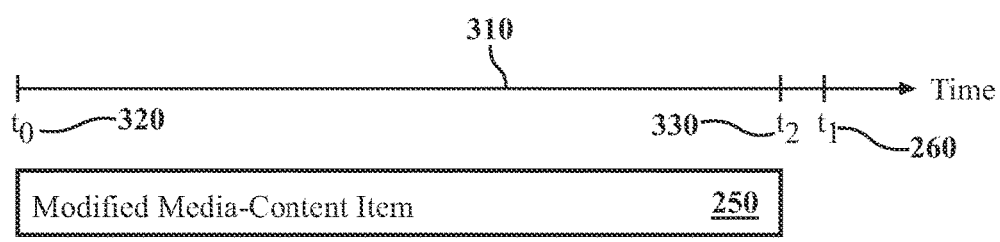

FIG. 4A illustrates a media-content item 245 whose duration is shorter than the available time. As discussed above, in a situation such as that shown in FIG. 4A, adjustment module 230 automatically processes the media-content item 245 to generate a modified media-content item 250 having a longer duration that more fully occupies the available time. This is illustrated in FIG. 4B.

Figure 5A:
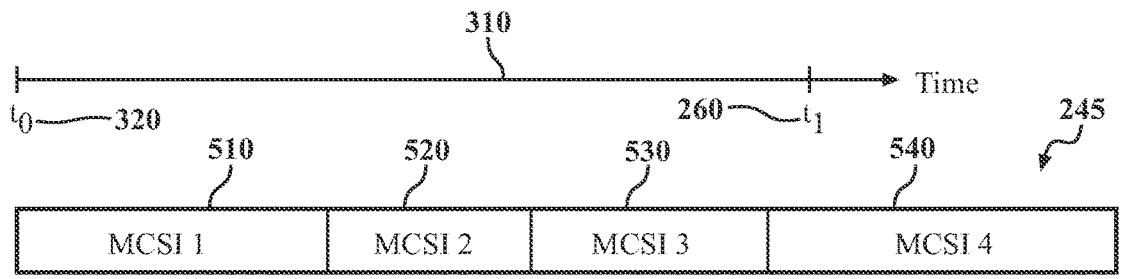
FIGS. 5A and 5B illustrate an example of processing a media-content item made up of multiple media-content subitems to shorten the overall duration of the media-content item, in accordance with an illustrative embodiment of the invention.
Figure 5B:
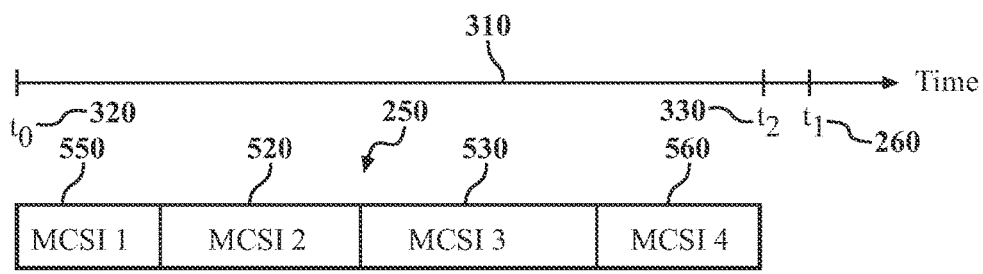

FIG. 5A illustrates a different embodiment in which a media-content item 245 is composed of a plurality of media-content subitems (MCSIs) 1-5 (510, 520, 530, and 540, respectively) that are to be presented to a vehicle occupant in serial fashion (one after the other). The depiction, in FIG. 5A, of four MCSIs is merely illustrative. In other embodiments, there can be more or fewer MCSIs. As shown in FIG. 5A, in this embodiment the overall composite media-content item 245 has a duration that is longer than the available time. In such a situation, adjustment module 230 processes one or more of the constituent MCSIs to shorten their durations such that presentation of the plurality of MCSIs (the overall modified media-content item 250) fits within the available time, as illustrated in FIG. 5B. In FIG. 5B, adjustment module 230 has processed MCSI 1 (550) and MCSI 4 (560) to shorten their respective durations. As indicated in FIG. 5B, presentation of the modified media-content item 250 (the collection of four MCSIs, two of which have been shortened) concludes at the predetermined time 330 ($t_2$).

Figure 6A:
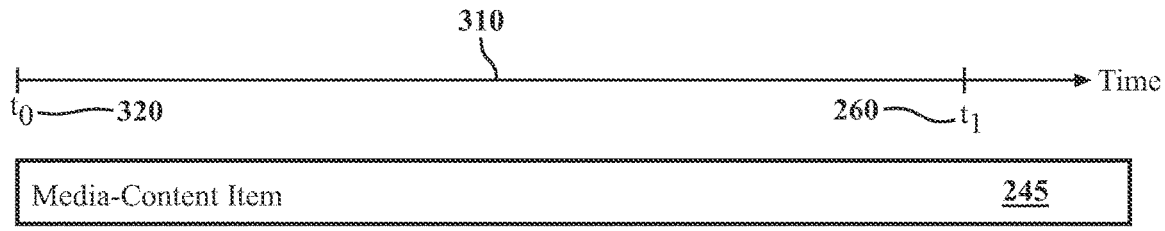
FIGS. 6A-6C illustrate an example of processing an already shortened media-content item to lengthen its duration in response to a change in the estimated time of an operational design domain (ODD) boundary for a vehicle, in accordance with an illustrative embodiment of the invention.
Figure 6B:
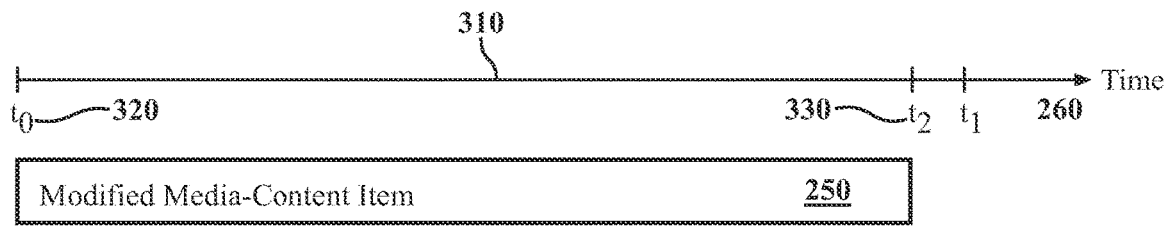
Figure 6C:
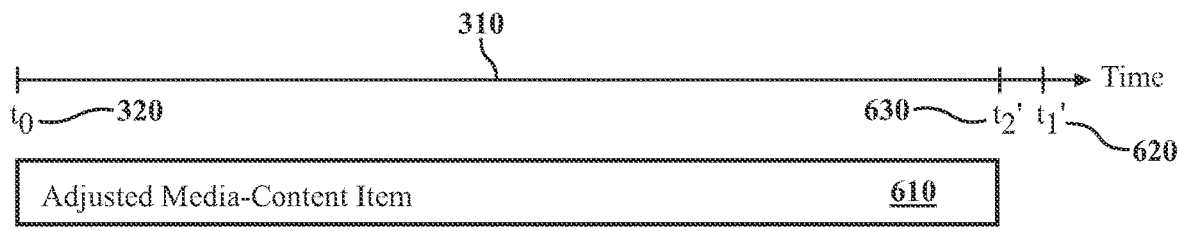

FIGS. 6A-6C illustrate a situation in which the ODD boundary changes after adjustment module 230 has already processed a media-content item 245 to generate a modified media-content item 250 having a shorter or longer duration than the original media-content item 245. In FIG. 6A, a media-content item 245 has a duration longer than the available time, as discussed above. FIG. 6B illustrates adjustment module 230 having processed the media-content item 245 in FIG. 6A to shorten its duration so that its presentation concludes at the predetermined time 330 ($t_2$). In this example, the ODD boundary subsequently changes to occur at a later time based on new information or changed circumstances. Estimation module 220 responds by determining an updated estimated time 620 ($t'_1$) for the occurrence of the changed ODD boundary. Adjustment module 230 then processes the modified media-content item 250 or, in some embodiments, the original media-content item 245 to generate an adjusted media-content item 610 having a duration such that presentation of the adjusted media-content item 610 concludes at an updated predetermined time 630 ($t'_2$) not later than the updated estimated time 62 ($t'_1$). The adjustment to the media-content item 245 or the modified media-content item 250 just described is illustrated in FIG. 6C.

As with the other embodiments discussed above, in some embodiments the updated predetermined time 630 coincides with the updated estimated time 620. In other embodiments, the updated predetermined time 630 precedes the updated estimated time 620 somewhat (e.g., from a few seconds to a few minutes).

To shorten or lengthen the duration of a media-content item 245, adjustment module 230 can employ a variety of different techniques singly or in combination, depending on the embodiment. As mentioned above, in some embodiments, adjustment module 230 employs one or more AI techniques such as ML models. For example, in one embodiment, adjustment module 230 inputs the media-content item 245 to a LLM such as ChatGPT, LLaMa, or PaLM2 with the desired duration (e.g., the difference between the predetermined time 330 and the start time 320) as a constraint. As those skilled in the art are aware, the LLMs just mentioned are examples of generative-AI models. The generative-AI model modifies the data, including video data, if applicable, in the media-content item 245 to produce a version of the media-content item 245 that meets the constraint (i.e., the desired duration). This is similar to technology that produces so-called "deep fake" videos. For example, as those skilled in the art are aware, generative-AI models currently exist that are capable of generating a full-motion video from a few still images. Such generative-AI models can be trained to identify the most relevant/important segments of a media-content item 245. In the literature, techniques to shorten or lengthen the duration of a video media-content item 245 using AI techniques are sometimes referred to as video summarization and extension techniques.

In some embodiments, the original media-content item 245 is itself generated by a generative-AI model. In some cases, the AI-generated media-content item 245 has an associated textual script. In modifying the media-content item 245 to generate a modified media-content item 250 having a shorter or longer duration, adjustment module 230 can use an LLM to modify the textual script and generate corresponding video and/or audio that matches the modified (shortened or lengthened) textual script.

In some embodiments, adjustment module 230 uses other video-shortening techniques to shorten the duration of a video media-content item 245. For example, adjustment module 230 can identify and omit frames of video from a media-content item 245 that are without dialogue. That is, adjustment module 230 can omit frames of video in which no person speaks to shorten the video's duration.

In some embodiments, adjustment module 230 analyzes (e.g., with the assistance of a ML-based model) the content of a media-content item 245 to identify lower priority segments/sections that can be omitted without damaging the coherence and meaningfulness of the media-content item 245 for the vehicle occupant who consumes the media-content item 245.

In the case of a video-game media-content item 245, adjustment module 230 can use any of several different techniques singly or in combination to shorten or lengthen the duration of the video game. For example, adjustment module 230 can automatically adjust the difficulty level of the video game to influence how long it takes the vehicle occupant playing the game to complete a given level of the game. In some embodiments, adjustment module 230 omits levels or portions of levels of the video game to shorten the game. In other embodiments, adjustment module 230 uses a generative-AI model to expand (lengthen) one or more levels or portions of levels to lengthen the video game.

The generative-AI techniques discussed above for shortening or lengthening the duration of a media-content item 245 can also be applied to text items such as ebooks or news articles. As with other types of media-content items 245 such as videos, a text-item media-content item 245 might, in the first instance, be generated by a LLM. The "duration" of a text-item media-content item 245 depends on the reading speed of the vehicle occupant who consumes it. In gauging the duration of presenting a text item to a vehicle occupant (i.e., the time it will take for the vehicle occupant to read the text item), estimation module 220 can take into account the average reading speed of the vehicle occupant inferred from prior observations. A ML model, for example, can learn subtleties such as accounting for the difficulty level of and/or the vehicle occupant's level of interest in a particular text-item media-content item 245.

Figure 7:
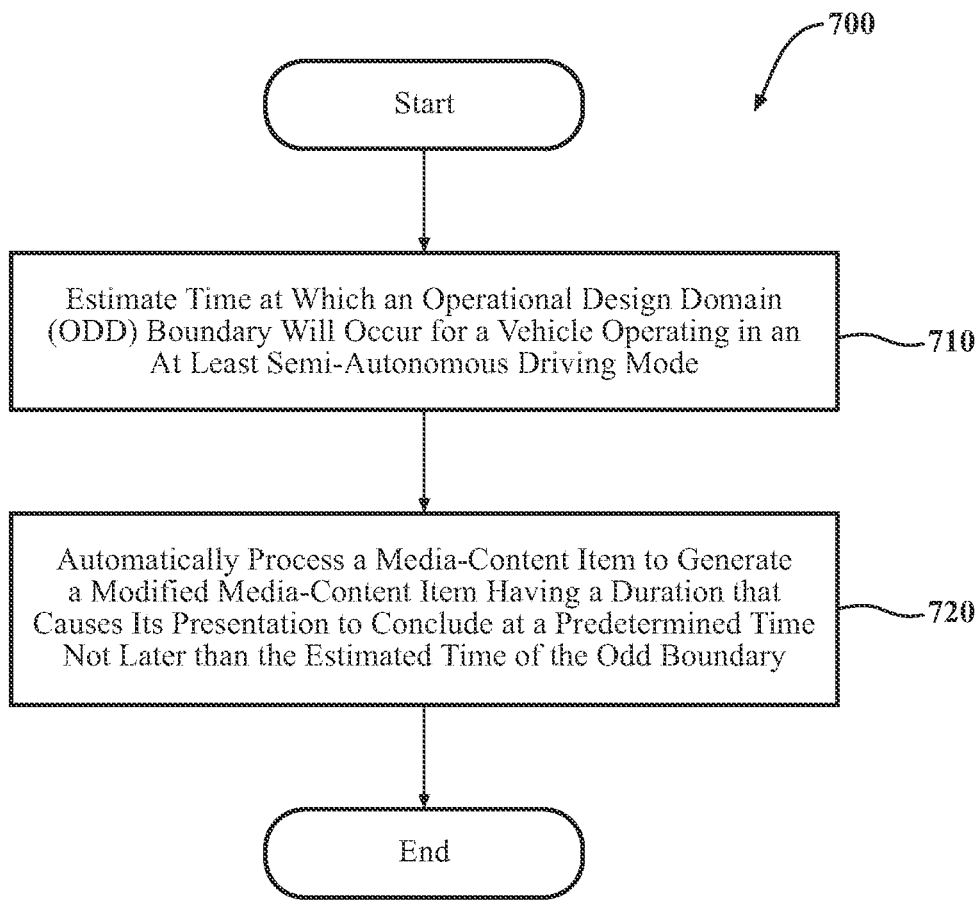
FIG. 7 is a flowchart of a method of adjusting presentation of media content in a vehicular environment, in accordance with an illustrative embodiment of the invention.

FIG. 7 is a flowchart of a method 700 of adjusting presentation of media content in a vehicular environment, in accordance with an illustrative embodiment of the invention. Method 700 will be discussed from the perspective of the media-content adjustment system 170 in FIG. 2. While method 700 is discussed in combination with media-content adjustment system 170, it should be appreciated that method 700 is not limited to being implemented within media-content adjustment system 170, but media-content adjustment system 170 is instead one example of a system that may implement method 700.

At block 710, estimation module 220 estimates a time (260) at which an ODD boundary will occur for a vehicle 100 that is operating in an at least semi-autonomous driving mode. As discussed above, an ODD boundary is an event that falls into one of two categories: (1) the end of or an intermediate stop during the current trip or (2) a planned handover of control of the vehicle 100 to a human driver at a future time.

As also discussed above, estimation module 220 receives information concerning upcoming ODD boundaries from a variety of information sources, including, without limitation, traffic information servers, weather information servers, navigation system 147, autonomous driving module(s) 160, map data 116, and other vehicle components and systems (e.g., an electrical charging system or fuel system). Based on that received information, estimation module 220 can calculate an estimated time 260 of occurrence of an ODD boundary. Several examples of estimation module 220 calculating the estimated time 260 are discussed above.

At block 720, adjustment module 230 processes automatically a media-content item 245 presented to an occupant of the vehicle 100 to generate a modified media-content item 250, the modified media-content item 250 having a duration that results in presentation of the modified media-content item 250 concluding at a predetermined time 330 not later than the estimated time 260. As discussed above, adjustment module 230 can shorten or lengthen the duration of a media-content item 245 through various automatic data summarization or extension technologies, including technologies that employ ML models such as generative-AI models, LLMs, or other types of ML models. In some embodiments, more direct or deterministic techniques can be employed. For example, to shorten a video media-content item 245, adjustment module 230 can omit video frames that are without dialogue.

As discussed above, the predetermined time 330 varies, depending on the embodiment and the circumstances surrounding a particular ODD boundary. In some embodiments, the predetermined time 330 coincides with the estimated time 260. In other embodiments, adjustment module 230 can select the predetermined time to be somewhat earlier (e.g., from a few seconds to a few minutes) than the estimated time 260. In situations in which the ODD boundary involves a planned handover, it is advantageous to select a predetermined time that gives a human driver of vehicle 100 adequate time to prepare to take over control of vehicle 100 (e.g., 1 to 3 minutes, in some embodiments).

As discussed above, in some embodiments, adjustment module 230 notifies the vehicle occupant consuming a media-content item 245 that the media-content item 245 has been modified to fit the available time. In some of those embodiments, adjustment module 230 asks the vehicle occupant to confirm modification of the media-content item 245 to shorten or lengthen its duration. If a situation arises in which the available time is much shorter than the nominal duration of a media-content item 245, adjustment module 230 can optionally offer to substitute one or more different media-content items 245 that will fit within the available time.

As discussed above, in some embodiments, estimation module 220 automatically updates the estimated time 260 in response to a change in the ODD boundary (refer to updated estimated time 620 in FIG. 6C). Adjustment module 230 then automatically processes the modified media-content item 250 (or, in some embodiments, the original media-content item 245) to generate an adjusted media-content item 610. The adjusted media-content item 610 has an updated duration (longer or shorter than the modified media-content item 250) that results in presentation of the adjusted media-content item 610 concluding at an updated predetermined time 630 not later than the updated estimated time 620. As discussed above, in some embodiments the updated predetermined time 630 coincides with the updated estimated time 620. In other embodiments, the updated predetermined time 630 somewhat precedes the updated estimated time 620 (e.g., from a few seconds to a few minutes).

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations Various implementations are shown in FIGS. 1-7, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for adjusting presentation of media content in a vehicular environment, the system comprising:
   a processor; and
   a memory storing machine-readable instructions that, when executed by the processor, cause the processor to:
   estimate a time at which an operational design domain (ODD) boundary will occur for a vehicle that is operating in an at least semi-autonomous driving mode; and
   process automatically a media-content item presented to an occupant of the vehicle to generate a modified media-content item, the modified media-content item having a duration that results in presentation of the modified media-content item concluding at a predetermined time not later than the estimated time, wherein the machine-readable instructions to process automatically the media-content item include instructions that, when executed by the processor, cause the processor to use a machine-learning model to perform one of shortening the media-content item to enable the vehicle occupant to finish the modified media-content item before the ODD boundary occurs and lengthening the media-content item such that the modified media-content item fills a predetermined amount of available time before the ODD boundary occurs.

2. The system of claim 1, wherein the media-content item is one of a video, an audio recording, an item of text, and a video game.

3. The system of claim 1, wherein the machine-learning model is a generative artificial intelligence (generative-AI) model.

4. The system of claim 3, wherein the generative-AI model is a large language model.

5. The system of claim 1, wherein the media-content item includes a video and the instructions to use a machine-learning model to perform one of shortening and lengthening the media-content item include instructions that, when executed by the processor, cause the processor to shorten the media-content item by omitting, from the video, one or more video frames that are without dialogue.

6. The system of claim 1, wherein the media-content item is composed of a plurality of media-content subitems presented to the occupant of the vehicle in serial fashion and the machine-readable instructions to process automatically the media-content item include instructions that, when executed by the processor, cause the processor to modify one or more of the media-content subitems such that presentation of the plurality of media-content subitems concludes at the predetermined time.

7. The system of claim 1, wherein the ODD boundary is one of an end of a current trip made by the vehicle, an intermediate stop during the current trip, and a planned handover of control of the vehicle to a human driver.

8. The system of claim 1, wherein the machine-readable instructions include further instructions that, when executed by the processor, cause the processor to:
   update the estimated time in response to a change in the ODD boundary; and
   process automatically one of the media-content item and the modified media-content item to generate an adjusted media-content item, the adjusted media-content item having an updated duration that results in presentation of the adjusted media-content item concluding at an updated predetermined time not later than the updated estimated time.

9. A non-transitory computer-readable medium for adjusting presentation of media content in a vehicular environment and storing instructions that, when executed by a processor, cause the processor to:
   estimate a time at which an operational design domain (ODD) boundary will occur for a vehicle that is operating in an at least semi-autonomous driving mode; and
   process automatically a media-content item presented to an occupant of the vehicle to generate a modified media-content item, the modified media-content item having a duration that results in presentation of the modified media-content item concluding at a predetermined time not later than the estimated time, wherein the instructions to process automatically the media-content item include instructions that, when executed by the processor, cause the processor to use a machine-learning model to perform one of shortening the media-content item to enable the vehicle occupant to finish the modified media-content item before the ODD boundary occurs and lengthening the media-content item such that the modified media-content item fills a predetermined amount of available time before the ODD boundary occurs.

10. The non-transitory computer-readable medium of claim 9, wherein the machine-learning model is a generative artificial intelligence (generative-AI) model.

11. The non-transitory computer-readable medium of claim 10, wherein the generative-AI model is a large language model.

12. The non-transitory computer-readable medium of claim 9, wherein the media-content item includes a video and the instructions to use a machine-learning model to perform one of shortening and lengthening the media-content item include instructions that, when executed by the processor, cause the processor to shorten the media-content item by omitting, from the video, one or more video frames that are without dialogue.

13. A method, comprising:
   estimating, using a processor, a time at which an operational design domain (ODD) boundary will occur for a vehicle that is operating in an at least semi-autonomous driving mode; and
   processing automatically a media-content item presented to an occupant of the vehicle to generate a modified media-content item, the modified media-content item having a duration that results in presentation of the modified media-content item concluding at a predetermined time not later than the estimated time, wherein the processing automatically the media-content item includes using a machine-learning model to perform one of shortening the media-content item to enable the vehicle occupant to finish the modified media-content item before the ODD boundary occurs and lengthening the media-content item such that the modified media-content item fills a predetermined amount of available time before the ODD boundary occurs.

14. The method of claim 13, wherein the media-content item is one of a video, an audio recording, an item of text, and a video game.

15. The method of claim 13, wherein the machine-learning model is a generative artificial intelligence (generative-AI) model.

16. The method of claim 15, wherein the generative-AI model is a large language model.

17. The method of claim 13, wherein the media-content item includes a video and shortening the media-content item includes omitting, from the video, one or more video frames that are without dialogue.

18. The method of claim 13, wherein the media-content item is composed of a plurality of media-content subitems presented to the occupant of the vehicle in serial fashion and one or more of the media-content subitems are modified such that presentation of the plurality of media-content subitems concludes at the predetermined time.

19. The method of claim 13, wherein the ODD boundary is one of an end of a current trip made by the vehicle, an intermediate stop during the current trip, and a planned handover of control of the vehicle to a human driver.

20. The method of claim 13, further comprising:
   updating the estimated time in response to a change in the ODD boundary; and
   processing automatically one of the media-content item and the modified media-content item to generate an adjusted media-content item, the adjusted media-content item having an updated duration that results in presentation of the adjusted media-content item concluding at an updated predetermined time not later than the updated estimated time.

\* \* \* \* \*